(12) United States Patent
Grover et al.

(10) Patent No.: US 9,191,270 B2
(45) Date of Patent: Nov. 17, 2015

(54) PATH SEGMENT PROTECTING P-CYCLES

(71) Applicant: Telecommunications Research Laboratories, Edmonton (CA)

(72) Inventors: Wayne D. Grover, Edmonton (CA); Ganxiang Shen, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 13/663,426

(22) Filed: Oct. 29, 2012

(65) Prior Publication Data

US 2013/0114403 A1 May 9, 2013

Related U.S. Application Data

(63) Continuation of application No. 10/620,302, filed on Jul. 14, 2003, now abandoned.

(60) Provisional application No. 60/430,931, filed on Dec. 20, 2002.

(51) Int. Cl.
*H04L 12/24* (2006.01)
*H04L 12/707* (2013.01)
(Continued)

(52) U.S. Cl.
CPC ......... *H04L 41/0668* (2013.01); *H04J 14/0268* (2013.01); *H04J 14/0284* (2013.01); *H04L 41/0663* (2013.01); *H04L 45/22* (2013.01); *H04L 45/28* (2013.01); *H04L 41/145* (2013.01)

(58) Field of Classification Search
None
See application file for complete search history.

(56) References Cited

U.S. PATENT DOCUMENTS

| | | | |
|---|---|---|---|
| 4,956,835 A | 9/1990 | Grover | |
| 5,093,824 A | 3/1992 | Coan et al. | |
| 5,146,452 A | 9/1992 | Pekarske | |

(Continued)

FOREIGN PATENT DOCUMENTS

| | | |
|---|---|---|
| EP | 1 146 682 A2 | 10/2001 |
| WO | 97/06645 A1 | 2/1997 |
| WO | 97/06644 A1 | 5/2015 |

OTHER PUBLICATIONS

Ellinas et al., "Protection cycles in mesh WDM networks," *IEEE Journal on Selected Areas in Communications* 18(10):1924-1936, Oct. 2000.

(Continued)

*Primary Examiner* — German J Viana Di Prisco
(74) *Attorney, Agent, or Firm* — Seed IP Law Group PLLC

(57) ABSTRACT

This disclosure introduces a significant extension to the method of p-cycles for network protection. The main advance is the generalization of the p-cycle concept to protect multi-span segments of contiguous working flow, not only spans that lie on the cycle or directly straddle the p-cycle. This effectively extends the p-cycle technique to include path protection, or protection of any flow segment along a path, as well as the original span protecting use of p-cycles. It also gives an inherent means of transit flow protection against node loss. We present a capacity optimization model for the new scheme and compare it to prior p-cycle designs and other types of efficient mesh-survivable networks. Results show that path-segment-protecting p-cycles ("flow p-cycles" for short) have capacity efficiency near that of a path-restorable network without stub release. An immediate practical impact of the work is to suggest the of use flow p-cycles to protect transparent optical express flows through a regional network.

22 Claims, 4 Drawing Sheets

(51) Int. Cl.
   *H04L 12/703*   (2013.01)
   *H04J 14/02*    (2006.01)

(56) References Cited

U.S. PATENT DOCUMENTS

| | | | |
|---|---|---|---|
| 5,239,537 | A | 8/1993 | Sakauchi |
| 5,463,615 | A | 10/1995 | Steinhorn |
| 5,513,345 | A | 4/1996 | Sato et al. |
| 5,537,532 | A | 7/1996 | Chng et al. |
| 5,850,505 | A | 12/1998 | Grover et al. |
| 5,999,286 | A | 12/1999 | Venkatesan |
| 6,052,796 | A | 4/2000 | Croslin |
| 6,324,162 | B1 | 11/2001 | Chaudhuri |
| 6,331,905 | B1 | 12/2001 | Ellinas et al. |
| 6,377,543 | B1 | 4/2002 | Grover et al. |
| 6,404,734 | B1 | 6/2002 | Stamatelakis et al. |
| 6,421,349 | B1 | 7/2002 | Grover |
| 6,760,302 | B1 | 7/2004 | Ellinas et al. |
| 6,795,394 | B1 | 9/2004 | Swinkels et al. |
| 6,914,880 | B1 | 7/2005 | Grover et al. |
| 6,982,951 | B2 | 1/2006 | Doverspike et al. |
| 2002/0071392 | A1 | 6/2002 | Grover et al. |
| 2002/0181393 | A1 | 12/2002 | Grover et al. |
| 2003/0067648 | A1* | 4/2003 | Antosik et al. ............ 359/124 |

OTHER PUBLICATIONS

Grover et al., "Bridging the ring-mesh dichotomy with p-cycles," *IEEE/VDE DRCN 2000*, Munich, Germany, pp. 92-104, Apr. 2000.

Grover et al., "Comparative methods and issues in design of mesh-restorable STM and ATM networks," *Telecommunication Network Planning*, editors Sanso et al., Kluwer Academci Publishers, 1999, pp. 169-200.

Grover et al., "Cycle-oriented distribution preconfiguration: Ring-like speed with mesh-like capacity for self-planning network restoration," ICC '98, Jun. 1998, 7 pages.

Grover et al., "Design of Meta-Mesh of Chain Sub-Networks," CA Application No. 2,359,168, filed Oct. 16, 2001, 48 pages.

Grover et al., "Method for Preconfiguring a Network to Withstand Anticipated Failures," CA Application No. 2,161,847, filed Oct. 31, 1995, 33 pages.

Grover et al., "New options and insights for survivable transport networks," *IEEE Communications Magazine* 40(1):34-41, Jan. 2002.

Grover et al., "Path Restoration of Networks," CA Application No. 2,212,933, filed Aug. 13, 1997, 155 pages.

Grover et al., "Potential for spare capacity preconnection to reduce crossconnection workloads in mesh-restorable networks," *Electronics Letters* 30(3):194-195, Feb. 3, 1994.

Grover et al., "Protection of Routers in a Telecommunications Network," CA Application No. 2,269,649, filed Apr. 22, 1999, 22 pages.

Grover et al., "Self-organizing closed path configuration of restoration capacity in broadband mesh transport networks," CCBR '98, Jun. 1998, 12 pages.

Grover, "Distributed restoration of the transport network," in *Network Management into the 21$^{st}$ Century*, editors Plevyak et al., IEEE/IEE Press Co-publication, Chapter 11, pp. 337-417, Feb. 1994.

Herzberg et al., "An optimal spare-capacity assignment model for survivable networks with hop limits," *IEEE Globecom 1994*, pp. 1601-1607.

Iraschko et al., "Optimal capacity placement for path restoration in mesh survivable networks," ICC 1996, Dallas, Jun. 1996, pp. 1568-1574.

Iraschko et al., "Optimal capacity placement for path restoration in STM or ATM mesh-survivable networks," *IEEE/ACM Trans. on Networking* 6(3):325-336, Jun. 1998.

Iraschko, "Path Restorable Networks," PhD Thesis, Edmonton, Alberta, 1996, pp. 56-85.

Kawamura et al., "Self-healing ATM networks based on virtual path concept," *IEEE Journal on Selected Areas in Communication* 12(1):120-127, Jan. 1994.

Miyao et al., "Optimal design and evaluation of survivable WDM transport networks," *IEEE Journal on Selected Areas in Communications* 16(7):1190-1998, Sep. 1998.

Stamatelakis et al., "Distributed Preconfiguration of Spare Capacity in Closed Paths for Network Restoration," CA Application No. 2,210,207, filed Jul. 11, 1997, 94 pages.

Stamatelakis et al., "Scalable Network Restoration Device," CA Application No. 2,280,981, filed Aug. 27, 1999, 23 pages.

Stamatelakis, "Theory and algorithms for preconfiguration of spare capacity in mesh restorable networks," M.Sc. Thesis, 1997.

Xiong et al., "Restoration strategies and spare capacity requirements in self-healing ATM networks," *IEEE/ACM Transactions on Networking* 7(1):98-110, Feb. 1999.

\* cited by examiner

NSFNET, $N$=14,
$S$=21, $|P|$=139

ARPA2, $N$=21,
$S$=25, $|P|$=18

SmallNet, $N$=10,
$S$=22, $|P|$=833

Bellcore, $N$=15,
$S$=28, $|P|$=976

PATH SEGMENT PROTECTING P-CYCLES

CROSS-REFERENCE TO RELATED APPLICATIONS

This application claims the benefit of U.S. Provisional Application No. 60/430,931, filed Dec. 5, 2002.

BACKGROUND OF THE INVENTION

One of the most interesting recent developments in survivable network architecture is the method of p-cycles. p-Cycles, or pre-configured cycles, introduced in 1998, are in a sense like BLSR rings, but with support for the protection of straddling span failures as well as the usual protection of spans on the ring itself. The most striking property of p-cycles is that they retain ring-like switching characteristics (only two nodes do any real time switching and are fully pre-planned for each failure) but can be designed with essentially the same capacity-efficiency as a span-restorable mesh network. Recent work has even found that with joint optimization of working path routing along with p-cycle placement, overall designs can approach the ultimate theoretical efficiency levels for any known class of restorable network and having the benefit of dynamic, failure-specific, path restoration. This means p-cycle based networks can be 3 to 6 times more capacity-efficient than ring-based networks while still providing BLSR ring switching speeds. In fact for straddling span failures, the average protection path has half the number of hops of the corresponding ring, so it may even be faster on average. Since 1998, the basic theory of p-cycles as pre-configured structures in the spare capacity of a mesh network has been developed, and there have been studies on self-organization of the p-cycle sets, application of p-cycles to the MPLS/IP layer, application to DWDM networking and studies on joint optimization of working paths and spare capacity. Notably, in one study it was found that full survivability against any span cut could be achieved with as little as 39% total redundancy. This greatly motivates continuing work and practical applications of the p-cycle concept.

Concurrent work on cycle covers under the coincidentally similar name of protection cycles should not be confused with p-cycles. The fundamentally important difference is the aspect of straddling spans in p-cycles. Straddling spans on a p-cycle can each bear two units of working capacity per unit of p-cycle capacity and they require no associated protection capacity on the same spans. All forms of ring or cycle covers fundamentally involve equal (or greater) amounts of protection and working capacity on every span and at best (which is what oriented cycle double covers in accomplishes) reach a 1-to-1 ratio between these, for 100% redundancy. In contrast p-cycles, due ultimately to the effectiveness of straddling span protection aspects, yield fully restorable architectures at well under 100% redundancy.

However, all work so far on p-cycles has been done on what can be called "span-protecting" p-cycles. Each such p-cycle protects only spans that are part of itself or that directly straddle the respective p-cycle. This disclosure extends span-protecting p-cycles to path-segment protecting p-cycles and addresses the issue of mutual capacity (which is intrinsic to any path oriented or multi-commodity flow type of recovery scheme) as well as the corresponding operational complexity in coordinating which paths can access which p-cycles. By extending the concept to path-segment protecting p-cycles, protection against node loss for transient flows by the span-protecting p-cycles is also provided, while flows originating or terminating at the failed nodes cannot be restored by any network rerouting technique. A method for simplifying the task of optimizing the network is also disclosed, the method also making it easier to solve the joint optimization problem.

SUMMARY OF THE INVENTION

In this invention, the difficulties with devising a path protection version of the p-cycle concept have been largely overcome with the concept, not specifically of end-to-end path p-cycles per se, but of path-segment protecting p-cycles, which provide enhanced protection of telecommunication networks. This approach is also referred to as "flow-protecting p-cycles" or "flow p-cycles".

Despite the complexity of whole networks based on flow p-cycles, more practical specific tactics are presented involving selective use of a few flow p-cycles in conjunction with other protection schemes. Two such concepts set forward in this disclosure are (i) to support transparent optical transport of express flows through a regional network and (ii) to use flow p-cycles around the perimeter of an autonomous system domain to provide a single unified and out-of-mind scheme for protecting all transit flows through the domain. Another important observation is that flow p-cycles inherently also can protect transit flows against node loss.

There is therefore provided a telecommunications network comprising plural nodes connected by plural spans and arranged to form a mesh network, at least one pre-configured cycle of spare capacity being established in the mesh network, the pre-configured cycle including plural nodes of the mesh network, and the plural nodes of the pre-configured cycle being configured to protect at least one path segment, where the path segment includes at least two intersecting nodes within the pre-configured cycle and at least one intermediate node in a path that includes the two intersecting nodes and straddles the pre-configured cycle. The path segments may be segments of a working path with a start node not connected to the pre-configured cycle. The path segments may be segments of a working path with an end node not connected to the pre-configured cycle. Establishing the pre-configured cycle may include a) pre-selecting a set of candidate cycles for forming into pre-configured cycles, allocating working paths and spare capacity in the mesh telecommunications network based on the set of candidate cycles; and c) providing the mesh telecommunications network with spare capacity arranged in pre-configured cycles according to the allocation determined in the preceding step. The allocation of working paths and spare capacity may be jointly optimized.

Pre-selecting candidate cycles may include ranking a set of closed paths in the mesh telecommunications network according to the degree to which each closed path protects spans on and off the closed path, and selecting candidate cycles from the set of closed paths.

Pre-selecting candidate cycles may comprise:

a) determining a scoring credit for each closed path in the set of closed paths, where the scoring credit of said closed path is calculated to predict the success of the closed path as a pre-configured cycle; and b) choosing a select number of closed paths based on the scoring credit to be the pre-selected candidate cycles.

Determining the scoring credit may be calculated by increasing said scoring credit by a value for each flow within said closed path that is protected by said closed path, increasing said scoring credit by a larger value for each flow not on said closed path that is protected by said closed path, weighting the value provided by each flow according to the traffic along said each flow and the length of each flow, and taking the ratio of said scoring credit with the cost of said closed path. A mixed selection strategy may be used for pre-selecting candidate cycles.

Establishing the pre-configured cycle may also comprise:

a) recording a list of corresponding path segments that intersect the pre-configured cycle at a node on the pre-configured cycle;

b) recording an identification of the path segments at the node on the pre-configured cycle that is intersected by the path segment.

Protecting a path segment may comprise, upon failure of a span in the path segment, the nodes with the identification of the path segments corresponding to the failed span recorded route the telecommunications traffic along the pre-configured cycle.

In a further aspect of the invention, the pre-configured cycle of spare capacity may be provided by:

a) identifying all working flows to be restored;

b) identifying the spare capacity of the pre-configured cycle to restore all working flows for all spans subject to failure in all path segments;

c) providing spare capacity along the pre-configured cycle sufficient to restore all working flows.

The path segment may be part of a path of an express flow through a network region. The pre-configured cycle may be an area boundary flow protecting p-cycle.

In a further aspect of the invention, there is provided a method of operating the claimed telecommunications network.

BRIEF DESCRIPTION OF THE DRAWINGS

There will now be given a brief description of the preferred embodiments of the invention, with reference to the drawings, by way of illustration only and not limiting the scope of the invention, in which like numerals refer to like elements, and in which.

This disclosure ends with table 1, which compares the results from simulations performed by the inventors of various restoration techniques on four different test networks.

DETAILED DESCRIPTION OF THE PREFERRED EMBODIMENTS

In this patent document, a mesh telecommunications network (also often called a "transport" network or "optical network") is a telecommunications network formed from plural nodes connected by plural spans. In this patent document, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

Figure 1A:
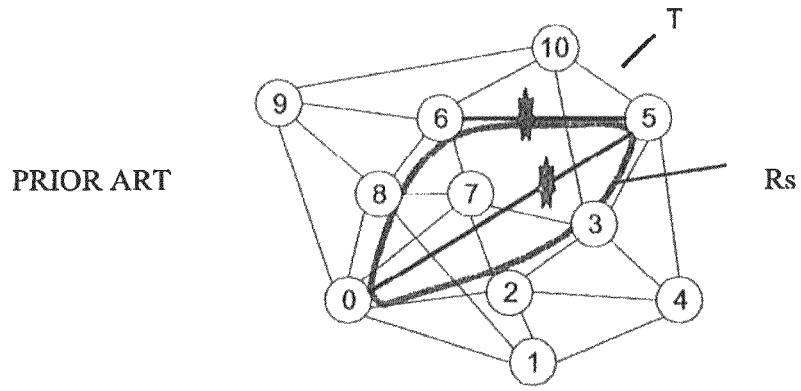
FIG. 1(a) shows a span protecting p-cycle in a network according to the prior art.

FIG. 1(a) shows a conventional span-protecting p-cycle according to the prior art, with nodes numbered 0, 1, 2, . . . , 10, in which the connecting spans of the network T are referred to as (i, k), where i is the beginning node and k is the terminating node, and paths are referred to as (i, j, k), where i is the beginning node, j is the intermediate section and may refer to more than one node, and k is the terminating node. Paths may also be referred to in abbreviated form by (i–k). The spans (0, 2), (2, 3), (3, 5), (5, 6), (6, 8), and (8, 0) are on-cycle spans of the p-cycle R shown. The span (0, 5) is not on the cycle, but its two end nodes are, making it a straddling span. A p-cycle can offer one protection path for the failure of any on-cycle span and two protection paths for the failure of any (of possibly several) disjoint straddling spans (one failure at a time). For example, if span (5, 6) fails, the route (5, 3, 2, 0, 8, 6) on cycle R offers one protection path to restore the failed span, in exactly the way a BLSR operates. But if span (0, 5) fails, paths (0, 2, 3, 5) and (0, 8, 6, 5) are both (simultaneously) available to provide protection paths. In either type of failure only two nodes do any switching in real time, and it is effectively identical to a preplanned BLSR switching reaction. In contrast a ring (or any form of cycle cover) only protects on-cycle spans. An example of protection against node failure can also be seen in this example. A failure of intermediate node 7 can break the flows between node pairs (1, 10) and (4, 9). While a span-protecting p-cycle cannot restore these affected transit flows, under the flow p-cycle in FIG. 1(b), the flows that transit node 7 can be recovered by the cycle. Note, however that any demands being added or dropped at node 7 cannot be handled by the same flow p-cycle. The flow must be unchanged in its composition between the nodes where it intersects the flow p-cycle.

Figure 1B:
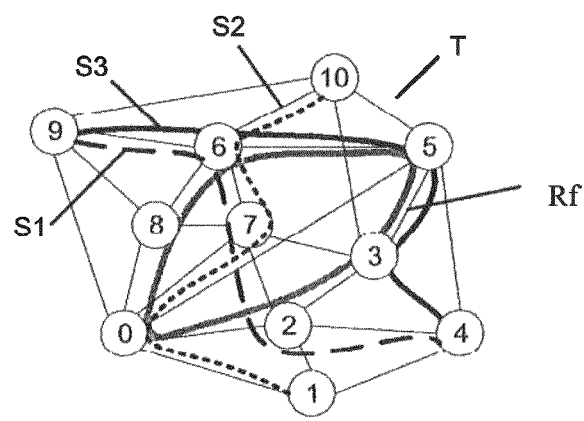
FIG. 1(b) shows the p-cycle viewed as a flow-protecting p-cycle according a preferred embodiment of the invention, FIGS. 2(a), (b), (c), (d), and (e) show various flow-to-cycle relationships, FIG. 3(a), (b), (c), and (d) are four test networks used as examples of the invention.

As is known in the art, it is the admission of straddling span protection relationships that dramatically reduces the total design redundancy relative to ring-based networks, to the point of near-equivalence with a span-restorable mesh network. Note, however, in FIG. 1(a) that spans (6, 7) and (7, 2), and several others, of the basic p-cycle are close to being straddling spans but cannot actually be span-protected by the cycle shown. However, a path segment that crosses both spans (6, 7) and (7, 2), as shown in FIG. 1(b), can be considered in isolation (when taking a path-level view) to straddle the cycle as if it was on its own virtual direct span that is a chord to the p-cycle. More specifically the path segment (6, 7, 2) can be considered to straddle cycle R, between the nodes 6 and 7, and is labeled as a straddling flow, as well as the path segment (6, 7, 0). This simple observation is the starting point for the fully general concept. To develop this we must now take an explicit view of the service paths S1, S2, and S3 crossing the network and how they relate to the p-cycles we may use for protection. FIG. 1(b), which has flows along paths (9, 6, 7, 2, 4) labeled S1, (10, 6, 7, 0, 1) labeled S2, and (9, 6, 5, 3, 4) labeled S3, shows this more highly resolved viewpoint in which we can design a flow p-cycle protected network. For convenience let us define a flow as any single contiguous segment of a working end-to-end path. Thus, the entire path, each span on the path, and any sequence of several spans along the path are flow segments that could be protected by flow-protecting p-cycles. Note that this can refer to a segment of a lightpath, an OC-n path, or an MPLS path. Contiguous means that the multiplexed demand composition of the respective lightpath, OC-n, or MPLS path is not altered by add/drop of constituent lower-rate payloads at any node of the segment. This situation is commonly referred to by saying that with respect to any intermediate nodes in the segment, the flow is an express flow.

Clearly flow p-cycle designs can access more opportunities for spare-capacity-sharing than the span p-cycle method. Any flow segment that intersects a flow p-cycle can be protected, not simply spans directly on or straddling the cycle. For example, if spans (2, 7) and (6, 7) in FIG. 1(a) incur failures, they cannot be restored by the span-protecting p-cycle Rs. But, under the flow p-cycle shown in FIG. 1(b), the contiguous flows that traverse spans (2, 7) and (6, 7) can be restored by the cycle Rf. Note, however that any demands being added or dropped at node 7 cannot be handled by the same flow p-cycle. The flow must be unchanged in its composition, or contiguous, between the nodes where it intersects the flow p-cycle. A similar situation is encountered if node 7 were to fail, where the span protecting p-cycle Rs cannot restore flows, while the flow protecting p-cycle can, except for demands being added or dropped at node 7. In this disclosure, it will be understood that a segment that is protected implies that the segment is protected against failure of any of its spans or nodes. Similarly, any reference to a span failure within a segment can equally be considered a node failure within the segment, unless it is obvious from the context that the failure must be a span.

Flow p-cycles can be categorized as the p-cycle equivalent to path restoration with failure-specific stub-reuse. This is an intermediate between completely general stub release and the complete prohibition against re-use of stub capacity that is built into the recent shared backup path protection scheme. In stub re-use the surviving path up to the protected segment is always part of the end to end path in the restored state. In other words the surviving stub path segments are always re-used in a failure specific way by the same path that used that capacity before the failure. Unlike stub release, which can permit the same or any other simultaneously failed path to exploit released stub capacity of failed paths, the stub re-use that is implicit in flow p-cycles requires no explicit real time actions to effect it.

Determining Flow-Protection Relationships

Given a cycle that is a candidate to be a flow p-cycle in a network design, the relation of any given path to the cycle can be either intersecting or non-intersecting. Only intersecting paths are relevant to the consideration of each candidate cycle. A path intersects a cycle if the two have at least two common nodes (which may include the source and destination nodes of the path). These are called intersection nodes. For example, the paths between nodes (4, 9) and (1, 10) in FIG. 1(b) both intersect the cycle shown and are relevant to the consideration of that cycle as a possible flow p-cycle. By inspection, that cycle would provide straddling-type protection to the two segments (6, 7, 2) and (0, 7, 6) and on-cycle protection to an example flow such as (6, 5, 3) should it exist. More generally, a path can intersect a cycle in a variety of more complex ways, involving more than two intersecting nodes.

Figure 2:
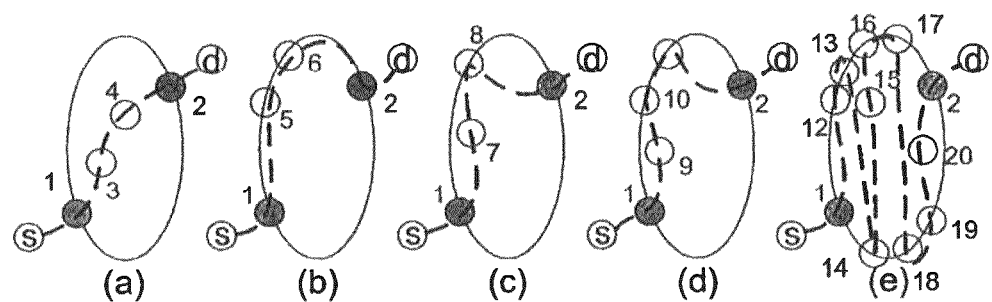

FIG. 2(a)-(e) depicts a variety of flow relationships, where s represents the start node, and d represents the end node, and in which numbers 1-20 represent nodes on or in the p-cycle. FIG. 2(a) displays the simplest scenario, where the cycle and the relevant flow segment intersect at two nodes 1 and 2, and the flow through nodes 3 and 4 does not share any other spans or nodes with the cycle. Analogous to the concept of a straddling span in conventional p-cycles, it is natural to call this a straddling flow relationship. Similarly, FIG. 2(b) depicts a flow segment (1, 5, 6, 2) in an on-cycle relationship, which is called an on-cycle flow. From here, more complex relationships of flows to cycles need to be recognized that do not arise with span-protecting p-cycles. FIG. 2(c) shows a three-node intersection relationship of what is otherwise a plain straddling flow labeled (1, 7, 8, 2). FIG. 2(d) shows an even more general intersecting flow relationship that produces two straddling portions (1, 9, 10) and (11, 2) and an on-cycle segment (10, 11). Conceptually the flow-to-cycle intersection relationship can be arbitrarily complex, such as in FIG. 2(e) where it passes through nodes (1, 12, 13, 14, 15, 16, 17, 18, 19, 20, 2). But the following important observation can be made about any of these intersection relationships, no matter how apparently complex: With respect to a cycle j, and any span failure i on the intersecting flow segment, it is always possible to determine by simple inspection whether a unit copy of protection capacity on cycle j can provide either one or two protection paths for the affected flow. For example, in FIGS. 2(b) and 2(a) there are respectively one and two protection paths available from the cycle for any span failure on the corresponding intersecting flow segments. FIG. 2(c) is in this regard equivalent to FIG. 2(a). In FIG. 2(d) two paths are available if the failure span is in either of the straddling segments, but only one if a span fails in the on-cycle segment. Thus, a preprocessing program can identify all the protection relationships between candidate cycles and the corresponding flow segments that it could protect. More formally this defines the topological parameters $\gamma_{i,j}^r \in (0,1,2)$, which give the number of protection relationship that a unit capacity on cycle j can (potentially) provide to the intersecting flow segment of the working path for end-node pair r, in the event of span failure i. It is zero if span i is not contained in a flow that intersects cycle j. It is one if span i is in an intersecting flow and is also a span of cycle j itself (i.e., an on-cycle relationship), and two otherwise (i.e., a straddling relationship). For a node, the notation would replace i with n such that $\gamma_{i,j}^r \in (0, 1, 2)$.

Mutual Capacity Considerations

Now comes the most complicating aspect of the concept of path-oriented p-cycles. The reason we said "potentially provide" above is that, as can be noted in FIG. 1(b), the ability of the cycle to provide the assessed number of protection paths can depend on which other path failures occur at the same time. Unlike span-protecting p-cycles, when a span fails in the flow-oriented context, path segments with more than one set of end nodes are affected simultaneously. Because the affected paths (more specifically here, the affected path segments) all have different intersecting nodes on the flow p-cycle, we get into the problem of "mutual capacity." This is the fundamentally complicating aspect of efficient multi node-pair re-routing problems. Here we can see the issue manifest itself in FIG. 1(b). If span (7,2) fails, then only the flow segment for path (4-9) needs protection and it can obtain two protection paths from the cycle shown. But if span (6,7) fails, then access to the same flow p-cycle must be coordinated between the segments for paths (9-4) and (10-1), which fail simultaneously. This failure-specific way in which a given p-cycle can be used in different ways requires a new family of intermediate variables, which is not needed in the design of networks using basic span p-cycles. These are the variables $n_{i,j}^r$ which denote number of unit-capacity copies of cycle j required to specifically restore the working flow for node pair r upon span failure i.

Flow-Protecting Design Model

We can now put together an integer linear programming (ILP) model for design of flow-protecting p-cycle networks. Because we are presently only introducing the concept we will consider the "non-joint" design case where working demands are first routed via their shortest paths, followed by optimization of the spare capacity for flow p-cycle placement. Similarly, the present model assumes "oeo" OXC nodes, or transparent optical cross-connects with a suitable pool of wavelength converters, so that regeneration and/or wavelength conversion needs can be assumed to be met as required at any node. The cost of this is assumed to be reflected in $c_k$ below. (The significance of these considerations is that the design model does not need to be burdened with simultaneously solving for explicit wavelength assignments and need consider only capacity-related costs). The parameters of the model are as follows. S is the set of spans in the network. Index i denotes spans specifically in a failure context, and k is used to index S in other general contexts. $D_i$ is the set of end-node pairs of paths affected by failure of span i, index r. P is set of all simple cycles of the graph that are candidates to become p-cycles, indexed by j. In practice P may be a limited set of candidate cycles that are eligible for use by virtue of limited circumference, hop count, or other engineering considerations. When needed to reduce computational difficulty, P may also be limited to containing only elite or highly promising candidate cycles. $c_k$ is the cost of adding a unit capacity (for instance an additional lightwave channel) to span k. $c_k$ values are pre-computed constants which may include considerations such as the type of facility involved, distance-related costs for using amplifiers, the cost of any o/e interfaces at the span terminating OXCs, and an amortized allocation of the OXC core costs and wavelength converter pool cost. d' is the number of demand units (for instance, lightpath requirements) on node pair r. As discussed above $\gamma_{i,j}^r \in (0,1,2)$ encodes the basic topological relationships between each span failure i with respect to the protection relationship cycle j provides for paths on demand pair r. Finally $\delta_{j,k}=1$ if cycle j includes span k, otherwise, 0.

The variables to be solved for are as follows: $n_j$ is the number of unit-capacity copies of cycle j to build, $s_k$ is the number of spare capacity units required on span k to support the set of flow p-cycles used and, as explained, $n_{i,j}^r$ is a family of intermediate variables that consider the number of copies of cycle j that are needed specifically for protection of path r against failure i. All variables are non-negative integers, although it can be seen from the problem structure that spare capacity can be relaxed without loss of integrality. The model is:

Flow p-cycles:

$$\text{Minimize} \sum_{k \in S} c_k s_k \quad (1)$$

Subject to:

$$\sum_{j \in P} \gamma_{i,j}^r \cdot n_{i,j}^r \geq d^r \forall\ i \in S; \forall\ r \in D_i \quad (2)$$

$$n_j \geq \sum_{r \in D_i} n_{i,j}^r \forall\ i \in S; \forall\ j \in P \quad (3)$$

$$s_k \geq \sum_{j \in P} n_j \cdot \delta_{j,k} \forall\ k \in S \quad (4)$$

The first constraint system asserts that affected working flows must be fully restored. The second says that the number of copies of cycle j to build is set by the largest failure-specific simultaneous use of unit copies of cycle j. This is like setting the spare capacity of a conventional span or path restorable mesh network to satisfy the largest simultaneously imposed set of restoration flows over the set of all non-simultaneous failure scenarios. The final constraint system says that the spare capacity on span k must be enough to support the number of copies of each p-cycle that overlies the span.

An important simplifying aspect to note about this model (relative to prior attempts at strictly path protecting p-cycles) is that it avoids explicit enumeration of the specific paths or path segments to be protected. Rather, the decisions about which protected path segments are defined come out implicitly from the choice of p-cycles that the solution employs. But since every span failure scenario is considered in the model, all spans (and hence all paths) wind up being implicitly protected end to end, but over one or more protected flow segments on each end-to-end path. This is the key sense in which the more general nature of the flow p-cycle paradigm overcomes the previous problems we mentioned in attempts to directly formulate end-to-end p-cycle path protection.

Figure 3A:
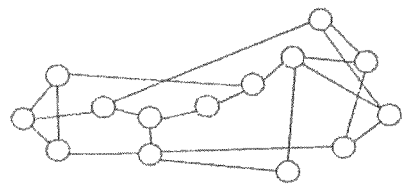
Figure 3B:
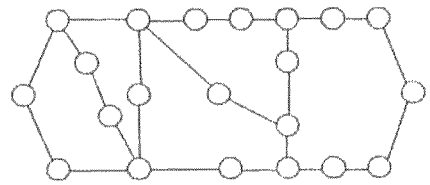
Figure 3C:
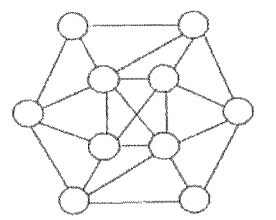
Figure 3D:
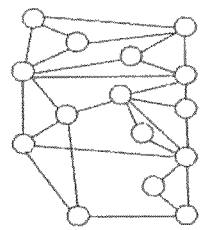

As an example, we present four test networks that have been used to obtain samples of flow p-cycle-based networks for analysis and evaluation. FIG. 3(a) is a network referred to as NSFNET, and has N=14, S=22, and |P|=139. FIG. 3(b) is a network referred to as ARPA2, and has N=21, S=25, and |P|=18. FIG. 3(c) is a network referred to as SmallNet, and has N=10, S=22, and |P|=833. FIG. 3(d) is a network referred to as Bellcore, and has N=15, S=28, and |P|=976, where N is its number of nodes, S its number of spans and |P| is the complete number of distinct simple cycles on the graph. Each network has span distances assigned in proportion to the Euclidean distances of the span in the networks as drawn above. Except for Bellcore, demands were generated for all node pairs from a uniform random distribution on [1 . . . 20] and the design problems were solved to optimality in under 2 hours with AMPL/CPLEX 7.1 on an Ultrasparc Sun Server at 450 MHz with 4 GB of RAM. The same demand generating procedure was used to create the Bellcore test case but only 50% of node pairs exchange non-zero demand quantities. The Bellcore solution required about a day and was solved to within 1.34% gap to optimality. The run times, however, can be improved by applying pre-selection strategies or other heuristics in general if warranted.

For comparative reference on each test network, optimal span-protection (SP) p-cycle designs, span-restorable (SR) mesh network designs as well as path-restoration designs with and without stub release were also produced for comparison. Notably the SP p-cycle reference designs here were actually produced with the flow p-cycles model by simply defining and equivalent demand matrix having non-zero values only between directly connected node pairs. The span- and path-restorable mesh reference designs were produced by known methods. The reference problems all solved in seconds or minutes at most.

Table 1 summarizes aspects of the results. For each test network, column 1 describes the span-protecting (SP) p-cycle designs, column 2 details the SR mesh designs and column 3 is for the flow p-cycle designs. Columns 4 and 5 are results for path restorable designs (PR) without, and with, stub release, respectively. (The sequence reflects the theoretically expected ranking in terms of increasing efficiency). All designs for each network have the identical working capacity and demand routing. The first row records the total spare capacity relative to the SP p-cycle design needed for 100% restorability against all single span failures. The next row shows the total design capacity cost relative to the SP p-cycle design. The third row shows the corresponding redundancy ratio of the overall network designs. This is followed by indication of the 1/(d−1) lower bound for SR mesh, for interpretive reference. The next row records, for the p-cycle designs, the number of distinct cycles on which p-cycles were formed. Below this is a characteristic measure for each scheme of the average number of reconfiguration actions involved for each span failure. For SR and PR mesh designs it is the average number of restoration paths per failure. For SP p-cycles, it is the average number of p-cycles switching per failure, and for flow p-cycles it is the average number of flow segments deviated onto p-cycles to protect against each span failure.

Interpretation of Results and Significance

The results show that the flow p-cycle method can yield significant reductions in spare capacity requirement relative to the SP p-cycle architectures, ranging from 12 to 25% on the first three networks. The performance differences over the test networks are related to the different network average nodal degrees, d. 1/(d−1) is a practical lower bound on redundancy for any span restoration scheme, and hence also for SP p-cycles, but notably here, we see the flow p-cycle designs edging very close or even below that bound, justifying their classification as a kind of path-restoration scheme.

Other diagnostic results indicate that a design based solely on flow p-cycles may have more distinct p-cycle structures than in SP p-cycle designs, although the differences are not more than twice and one test case (ARPA2) required only eight flow p-cycles whereas nine SP p-cycles were otherwise required.

Operational Aspects

Figure 4:
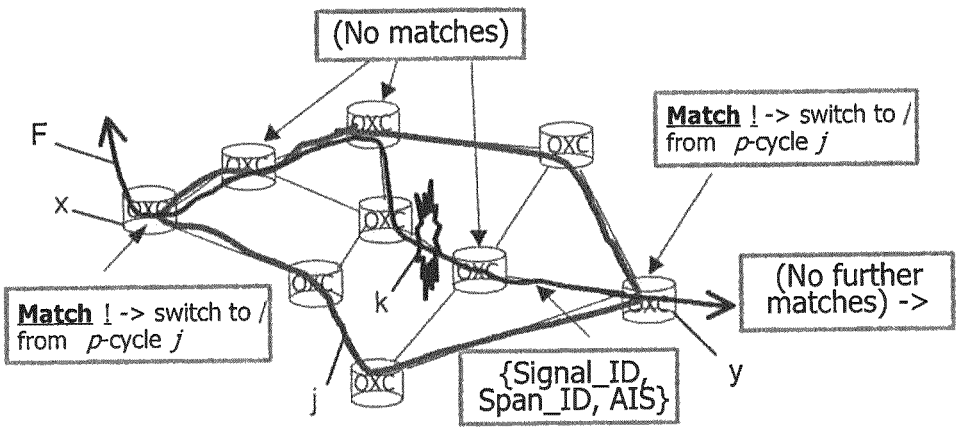
FIG. 4 depicts a simple application of the general concept.

Here we explain at least one scheme by which the flow p-cycle protection is put into effect in real time in reaction to a span failure, and shown pictorially in FIG. 4. We assume that p-cycles would be formed and sustained by OXC nodes under central control to connect the required spare wavelength channels together to create the desired set of p-cycles. At the time a p-cycle j is established through a node x, a list of the corresponding protected flow segments that intersect the cycle at that node is recorded in association with the p-cycle. The Signal_ID of the working path of which the p-cycle protects a segment is also recorded at the node for each span (as a possible failure) on the flow segment. In effect this data sets up matching conditions for node x to know locally which working signals (if any) it should switch into p-cycle j, depending on which span fails on any of the flow segments passing through it.

Upon failure, node x is either adjacent to the failure, in which case it sees LoS (loss of signal), or AIS (alarm indication signal) inserted downstream by the two nodes adjacent to the failure. All working signals bear a unique Signal_ID in their overheads and any time a node inserts AIS, it appends the ID of the incident span that has failed. Thus, at propagation speeds, the failure indication data {AIS, Signal_ID=Z, Span_ID=k} passes through all nodes on the failed path. But only node x will have been "pre-wired" with the matching conditions to associate Signal_ID=Z with locally accessible p-cycle j if an indication of its failure arrives, arising from span k. Thus a logical matching rule can be applied at any node seeing an AIS indication to quickly determine if it has a custodial responsibility to do protection switching for the failed signal. At node y, the Signal_ID is again matched, and the signal is switched off the p-cycle.

Simplified Applications of the General Concept

While it is a useful advance to understand the fully general model of flow-protecting p-cycles, the complexity may be judged higher than desired from a near-term operational standpoint. But an appreciation of the concept actually suggests some simpler specific adaptations of flow p-cycles that may be more practically manageable and useful. One of these is to only consider the use of flow p-cycles only for the important express flows through a network region. Conceptually one can picture an overall network design comprised in part of a set of simple fast-acting "local" span-protecting p-cycles. Logically overlaid on this is a select set of "express flow" protecting flow p-cycles. A particular economic advantage of this selective use of a few flow p-cycles is that the express flows they protect may take advantage of long-reach optical technology for optical bypass of all intermediate nodes on the protected flow segment. This allows the express flow signals to remain in the optical domain through the entire region, but remaining protected, saving considerably over the alternative of terminating on each OXC en route.

Figure 5:
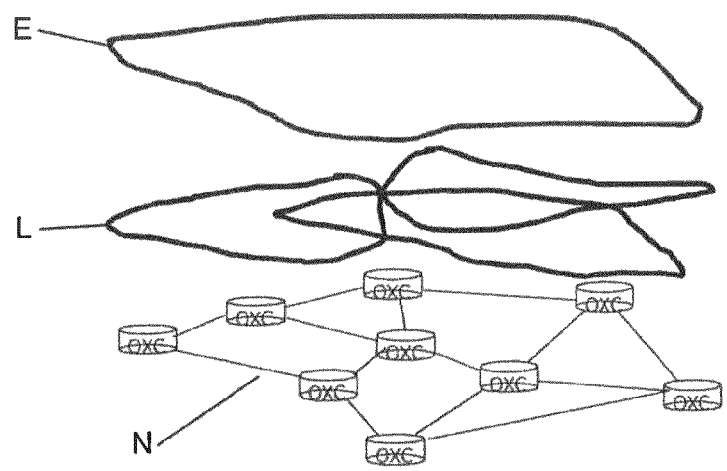
FIG. 5 shows the use of a mixture of flow-protecting and span-protecting p-cycles for optical bypass on express flow.

Closely related to this idea is the even more specific proposal of an area-boundary flow-protecting p-cycle. This is in the context of multi-domain optical networking. The idea is that within a domain, any local protection schemes could be used, but flows traveling entirely through the domain are protected by a domain perimeter flow p-cycle. The primary advantages of this would again be optical bypass savings and the simplicity of separating all transit flow considerations from the protection of intra-domain flows. The concept is summarized in FIG. 5, where closed loop E represents the flow-protecting p-cycle, or a regional flow protecting p-cycle and L represents the span-protecting p-cycles or local span protecting p-cycles for the network N consisting of OXC nodes. In a long-haul network the "diameter" of the express flow-protecting p-cycles may match the transparent optical reach limit of the path segments involved so wavelength conversion and regeneration can be provided at the flow p-cycle nodes only, with all-optical transmission on the protected path segments.

Pre-Selection and Joint Optimization Considerations

The design of the flow-protecting p-cycles can be improved by using a pre-selection strategy, which also makes solving the joint optimization problem feasible.

Figures 6A, 6B:
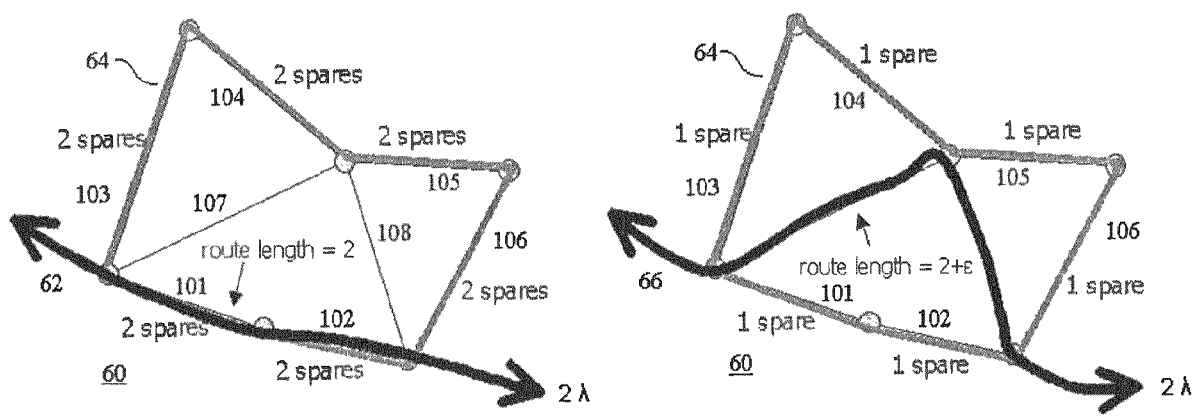
FIG. 6(a) depicts a network with a p-cycle that protects a working path which is following its shortest route over the graph.
FIG. 6(b) depicts a network with a p-cycle the choice of which is also coordinated with a changed working path routing so that the total of working and spare capacity required is minimized.

The aspect of jointness in a p-cycle design problem will now be discussed. The issue is that one can either first route the working demands via shortest paths (or any other means) and then solve a corresponding minimum spare capacity allocation problem (the non-joint problem), or, attempt to optimize the choice of working routes in conjunction with the placement of spare capacity together (i.e., jointly) to minimize total capacity (the joint problem). An example of the effect of solving the joint problem is shown in FIGS. 6(*a*) and (*b*). Network 60 is shown with flow 62 representing 2 units of capacity 2λ, and p-cycle 64 consisting of spans 101-106. In FIG. 6(*a*), flow 62 passes through spans 101 and 102, while in FIG. 6(*b*), flow 66 passes through spans 107 and 108. In FIG. 6(*a*), p-cycle 64 requires 2 units of spare capacity on spans 101-106, while FIG. 6(*b*) reduces the units of space capacity required for p-cycle 64 to one unit on spans 101-106 by increasing the length of the path of the working flow from 2 to 2+ε. Together these figures show how potentially advantageous it can be in terms of total capacity reduction, if the right choices of working path routing can be made, in conjunction with p-cycle placement choices, so as to realize the kind of savings evident in the example of FIGS. 6(a) and (b).

Figure 7A:
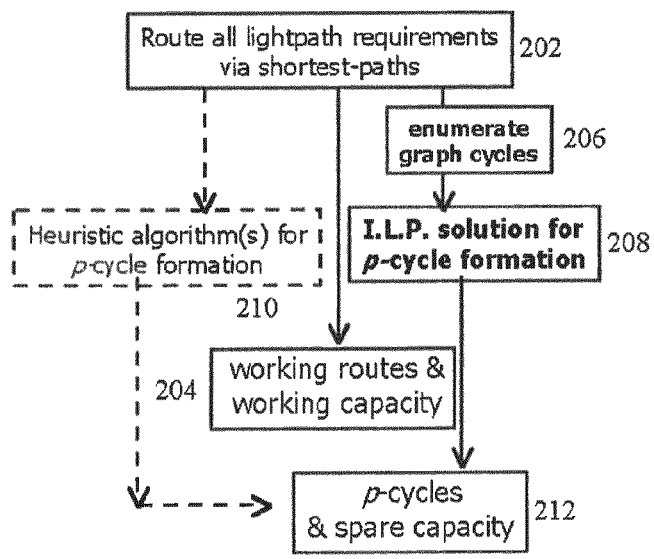
FIG. 7(a) is a flow chart representing the steps in a non-joint approach to network design.
Figure 7B:
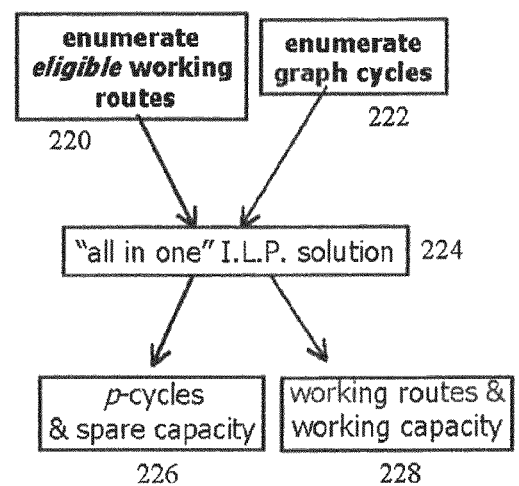
FIG. 7(b) is a flow chart representing the steps in a joint approach to network design.

A flow chart showing an example of how the non-joint problem is solved is shown in FIG. 7(a), where the first step in 202 is to route all lightpath requirements via the shortest path. Step 204 follows from this in defining all working paths and working capacities. To solve for the required p-cycles and spare capacity in 212, one can either enumerate all graph cycles as possible p-cycles in 206 and then use an ILP solution for p-cycle formation in 208, or one can use another heuristic algorithm(s) for p-cycle formation in 210. This process can be contrasted with the flow chart in FIG. 7(b), where the first steps 220 and 222 are to enumerate eligible working routes and enumerate graph cycles as potential p-cycles, respectively. These two sets are combined and solved in a single ILP solution in 224, from which the p-cycles and spare capacity are defined in 226, and the working routes and capacity are defined in 228.

To reduce the complexity of solving optimal p-cycle design problems, a scoring credit can be used, which considers not only topology information, but also the traffic demands of the flows that are potentially protected by the cycle. The definition is given as follows:

$$\frac{\sum_{r \in D, i \in S^r} l_r \cdot g_r \cdot \gamma_{i,j}^r}{\sum_{k \in P(j)} c_k} = \boxed{\text{credit of cycle } j \in P} \quad (5)$$

where D is set of nonzero demand pairs (i.e., flows) on the traffic matrix, indexed by r. $S^r$ is set of spans traversed by the working path between demand pair r. Here we assume there is only a single shortest working path existing between each demand pair. P(j) denotes cycle j in cycle set P. k enumerates spans on cycle P(j) and $c_k$ represents the unit cost of span k. As an example, the Euclidean distance of spans between the nodes they connect can be used to represent the span cost, $c_k$. $\gamma_{i,j}^r$ is as already defined, now applied to flows rather than spans, and $g_r$ denotes number of traffic demand units of the working flow between demand pair r. $l_r$ is the length of the working flow of demand pair r. Note that the purpose of weighting the above two terms is to assign a larger scoring credit to a cycle that can potentially protect "thicker" and "longer" flows (i.e., the larger the product of $g_r$ and $l_r$ is the more important the corresponding flow is to overall design efficiency.)

Other methods of ranking the candidate cycles may also be used, such as methods that focus strictly on topology of the network and do not consider traffic flows. For example, by removing $g_r$ and $l_r$ from equation 5, we leave $\gamma_{i,j}^r$ as the only term being summed in the numerator, and obtain a topological score that can rank the cycles. The equation then becomes:

$$\frac{\sum_{r \in D, i \in S^r} \gamma_{i,j}^r}{\sum_{k \in P(j)} c_k} = \boxed{\text{credit of cycle } j \in P} \quad (6)$$

The preceding example is to show that other combinations of variables that describe a network may be combined by those skilled in the art to obtain a ranked list of cycles in a network. The equation may be modified according to the situation that the invention is to be applied, where some factors may have more of an effect on the overall cost or efficiency.

The set of cycles are ranked according to their score, and highest ranked cycles can be pre-selected as candidate cycles for the rest of the problem. While the pre-selection criteria is effective in predicting the success of a particular cycle, it is possible have "too elite" a population of candidate cycles and it may be desirable to dilute the population with a few other types of candidates. The basic framework is one within which many specific heuristic ideas can be tried, all having to do with defining the reduced set of elite cycles to consider. First, some experience with memory and run times may show, for example, that a budget of 10,000 cycles is realistic to work with. The budget can be used up representing any number of mixed strategies for populating the elite P set.

An example could be:

Admit the 5,000 cycles found by the score-based selection above.

Add the 2,000 cycles with most absolute number of straddling path segments.

Add the 2,000 of the longest cycles.

Add 1,000 random cycles.

By itself the first set of cycles may not necessarily ensure feasibility. When choosing only individually elite cycles, there is no strict guarantee that a cycle will be represented that would cover, for example, a very long degree-2 chain connected to an otherwise highly connected mesh. However, cycles in batch three above definitely cover that eventuality.

Once the set of candidate cycles of the network graph have been characterized in this way, the problem can be solved using, for example, an integer linear programming (ILP) formulation, where the objective function minimizes the total cost of spare capacity and (for the joint problem) working capacity. ILP formulations are well known in the art and need not be further described here. This function is subject to:

A. All lightpath requirements are routed.

B. Enough WDM channels (or working channels in general) are provided to accommodate the routing of lightpaths in A.

C. The selected set of p-cycles give 100% span protection.

D. Enough spare channels are provided to create the p-cycles needed in C.

E. Integer p-cycles decision variables and integer capacity.

Applying the pre-selection criteria can be particularly useful in the joint optimization problem, where the formulation generates large problem files that can be difficult to solve optimally if there is no pre-selection.

Two points concerning the impact and relevance of the invention can be noted. Firstly, we note that, in general, the joint p-cycle design is as efficient as previously studied dynamic path-restorable designs in other studies to date. Such high efficiency is a direct benefit in terms of reduced cost or greater revenue from the same facilities, but an efficient network is also inherently a more flexible network because less of its resources are tied up for protection. Secondly, the simple process of pre-selecting candidate p-cycles greatly reduces p-cycle solution times so much that it may be practical to continually re-compute the optimal p-cycle configuration on-line as the network demand pattern evolves. This helps greatly to remove some prior objections to the practicality of p-cycle based networks and enables the vision of a continually adapting background layer of p-cycles.

Immaterial modifications may be made to the embodiments described in this disclosure without departing from the invention.

TABLE 1

Summary of Results

| | NSFNET | | | | | ARPA2 | | | | |
|---|---|---|---|---|---|---|---|---|---|---|
| | 1 | 2 | 3 | 4 | 5 | 1 | 2 | 3 | 4 | 5 |
| Spare Capacity | 1 | 96.7% | 75.3% | 72.5% | 60.0% | 1 | 94.1% | 88.9% | 71.4% | 67.7% |
| Norm. total cost | 1 | 98.7% | 90.5% | 89.5% | 84.7% | 1 | 96.8% | 94.0% | 84.6% | 82.6% |
| Redundancy 1/(d-1) | 62.1% | 60.0% | 46.8% 0.500 | 45.0% | 37.2% | 117.0% | 110.2% | 104.1% 0.724 | 83.6% | 79.3% |
| Num. of p-cycles chosen | 10 | — | 22 | — | — | 9 | — | 8 | — | — |
| Ave. num. of paths/cycles/ segs. per failure | 7 | 4 | 22 | 12 | 12 | 5 | 3 | 31 | 30 | 31 |
| Constraints | 42 | 441 | 2502 | 615 | | 50 | 625 | 1202 | 1325 | |
| Variables | 160 | 1354 | 17590 | 11213 | | 43 | 219 | 13129 | 7134 | |

| | SmallNet | | | | | Bellcore | | | | |
|---|---|---|---|---|---|---|---|---|---|---|
| | 1 | 2 | 3 | 4 | 5 | 1 | 2 | 3 | 4 | 5 |
| Spare Capacity | 1 | 97.5% | 78.6% | 74.5% | 68.8% | 1 | 92.0% | 91.7% | 76.1% | 73.6% |
| Norm. total cost | 1 | 99.3% | 93.6% | 92.4% | 90.7% | 1 | 97.4% | 97.3% | 92.1% | 91.3% |
| Redundancy 1/(d-1) | 42.3% | 41.2% | 33.2% 0.294 | 31.5% | 29.1% | 49.2% | 45.3% | 45.1% 0.366 | 37.5% | 36.2% |
| Num. of p-cycles chosen | 9 | — | 14 | — | — | 14 | — | 25 | — | — |
| Ave. num. of paths/cycles/ segs. per failure | 7 | 7 | 9 | 8 | 7 | 8 | 5 | 17 | 7 | 10 |
| Constraints | 44 | 484 | 18419 | 533 | | 53 | 781 | 16127 | 789 | |
| Variables | 855 | 6382 | 59998 | 20042 | | 1004 | 9929 | 76383 | 46809 | |

What is claimed is:

1. A telecommunications network, comprising:
   plural nodes connected by plural spans and arranged to form a mesh network;
   at least one pre-configured cycle of spare capacity being established in the mesh network, the pre-configured cycle including plural nodes of the mesh network and being pre-configured prior to a span or node failure; and
   the plural nodes of the pre-configured cycle being configured to protect at least one path segment, where the path segment includes at least a first intersecting node and a second intersecting node within the pre-configured cycle and at least one intermediate node in a path that includes the first intersecting node and second intersecting node and straddles the pre-configured cycle, the intermediate node not being a part of the pre-configured cycle, and the pre-configured cycle being configured to protect the path segment by the first intersecting node and the second intersecting node being pre-configured to reroute a working signal from the path segment to the pre-configured cycle in response to a signal indicating the failure of a span of the path segment, the span of the path segment being non-adjacent to at least one of the first intersecting node and the second intersecting node.

2. The telecommunications network of claim 1 in which path segments are segments of a working path with a start node not connected to the pre-configured cycle.

3. The telecommunications network of claim 1 in which path segments are segments of a working path with an end node not connected to the pre-configured cycle.

4. The telecommunications network of claim 1 in which pre-configured cycle of spare capacity is provided by:

a) identifying all working flows in the mesh network to be restored;
   b) identifying the spare capacity of the pre-configured cycle to restore all working flows for all spans subject to failure in all path segments; and
   c) providing spare capacity along the pre-configured cycle sufficient to restore all working flows.

5. The telecommunications network of claim 4 where the path segment is part of a path of an express flow through a network region.

6. The telecommunications network of claim 4 where the pre-configured cycle is an area boundary flow protecting p-cycle.

7. The telecommunications network of claim 1 in which the pre-configured cycle is established in the mesh network by:
   pre-selection of a set of candidate cycles for forming into pre-configured cycles;
   allocation of working paths and spare capacity in the mesh network based on the set of candidate cycles; and
   provision of spare capacity in the mesh network, the spare capacity being arranged in pre-configured cycles according to the allocation of working paths.

8. The telecommunications network of claim 7 in which the allocation of working paths and spare capacity is jointly optimized.

9. The telecommunications network of claim 7 in which pre-selection of the set of candidate cycles includes ranking a set of closed paths in the mesh network according to the degree to which each closed path protects spans on and off the closed path, and selecting candidate cycles from the set of closed paths.

10. The telecommunications network of claim 9 in which pre-selection of the set of candidate cycles further comprises:
   a) determining a scoring credit for each closed path in the set of closed paths, where the scoring credit of said closed path is calculated to predict the success of the closed path as a pre-configured cycle; and
   b) choosing a select number of closed paths based on the scoring credit to be the pre-selected candidate cycles.

11. The telecommunications network of claim 10 in which the scoring credit is calculated by increasing said scoring credit by a value for each flow within said closed path that is protected by said closed path, increasing said scoring credit by a larger value for each flow not on said closed path that is protected by said closed path, weighting the value provided by each flow according to the traffic along said each flow and the length of each flow, and taking a ratio of said scoring credit with the cost of said closed path.

12. The telecommunications network of claim 7 in which a mixed selection strategy is used for pre-selection of the set of candidate cycles.

13. The telecommunications network of claim 1 in which the pre-configured cycle is established in the mesh network by recording at a node on a pre-configured cycle an identification of protected flow paths that pass through the node and are protected by the pre-configured cycle.

14. The telecommunications network of claim 13 in which protecting a path segment comprises, upon failure of a span in a protected flow path, the node, at which the identification of the protected flow paths is recorded, routing the telecommunications traffic along the pre-configured cycle.

15. The telecommunications network of claim 1 in which the pre-configured cycle provides two restoration paths to protect against a failure of a span straddling the pre-configured cycle and one restoration path for a failure of a span on the pre-configured cycle.

16. A method of operating a telecommunications network, the telecommunications network comprising plural nodes connected by plural spans and arranged to form a mesh network, the method comprising the steps of:
   establishing at least one pre-configured cycle of spare capacity in the mesh network, the pre-configured cycle including plural nodes of the mesh network and being pre-configured prior to a span or node failure; and
   configuring the plural nodes of the pre-configured cycle to protect at least one path segment, where the path segment includes at least a first intersecting node and a second intersecting node within the pre-configured cycle and at least one intermediate node in a path that includes the first intersecting node and second intersecting node and straddles the pre-configured cycle, the intermediate node not being a part of the pre-configured cycle, and configuring the plural nodes of the pre-configured cycle to protect the at least one path segment comprising pre-configuring the first intersecting node and the second intersecting node to reroute a working signal from the path segment to the pre-configured cycle in response to a signal indicating the failure of a span of the path segment, the span of the path segment being non-adjacent to at least one of the first intersecting node and the second intersecting node.

17. The method of claim 16 in which the path segments are segments of a working path with a start node not connected to the pre-configured cycle.

18. The method of claim 16 in which the path segments are segments of a working path with an end node not connected to the pre-configured cycle.

19. The method of claim 16 in which the pre-configured cycle of spare capacity is provided by:
   a) identifying all working flows in the mesh network to be restored;
   b) identifying the spare capacity of the pre-configured cycle to restore all working flows for all spans subject to failure in all path segments; and
   c) providing spare capacity along the pre-configured cycle sufficient to restore all working flows.

20. The method of claim 16 in which establishing a pre-configured cycle comprises the steps of:
   pre-selecting a set of candidate cycles for forming into pre-configured cycles;
   allocating working paths and spare capacity in the mesh network based on the set of candidate cycles; and
   providing the mesh network with spare capacity arranged in pre-configured cycles according to the allocation determined in the preceding step.

21. The method of claim 20 in which the allocation of working paths and spare capacity is jointly optimized.

22. The method of claim 16 in which the pre-configured cycle provides two restoration paths to protect against a failure of a span straddling the pre-configured cycle and one restoration path for a failure of a span on the pre-configured cycle.

* * * * *